2,992,101
SUPPRESSION OF NEWTON'S RINGS IN PRINTING COLOR FILMS

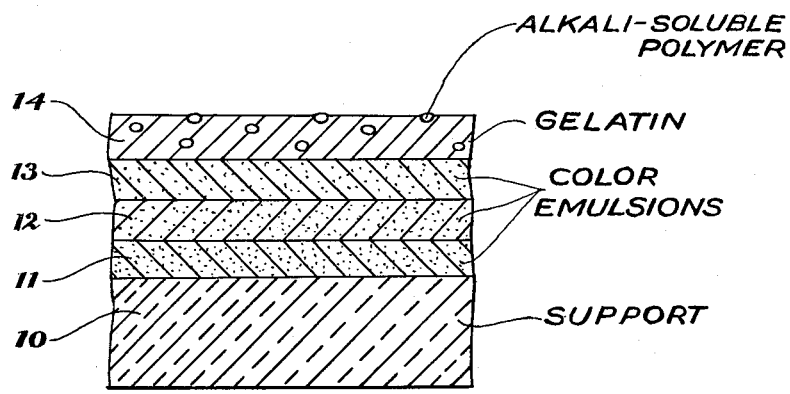

Edwin E. Jelley, Scheuring S. Fierke, and James H. Shepler, Rochester, N.Y., assignors to Eastman Kodak Company, Rochester, N.Y., a corporation of New Jersey Filed Feb. 18, 1957, Ser. No. 640,925
4 Claims. (Cl. 96—23)

This invention relates to the prevention of Newton's rings during the printing of multilayer color films.

The effects of Newton's rings in the printing of smooth-surfaced film negatives and positives in close contact with other smooth-surfaced light-sensitive photographic films is well known. Due to the light interference effects causing Newton's rings, the images being printed have color fringing to varying degrees. The condition is particularly noticeable in the contact printing of multilayer color films such as 35 mm. multilayer motion-picture films where the light interference colors cause color fringing of the images being printed into the individual emulsion layers.

Methods for the suppression of Newton's rings have previously been proposed and have included producing random irregularities on a surface of a film, for example, by roughening the film, or by spraying minute spots of lacquer such as a cellulose nitrate lacquer onto a film support in a random pattern as shown by Rackett U.S. Patent 2,363,689, November 28, 1944. In the latter case, the spray coating would adhere strongly to the film base and apparently not be removable should it be desired to renovate the film. The methanical methods such as roughening or embossing a surface of a film have obvious disadvantages.

We have discovered a process for preventing Newton's rings in printing color films which involves applying to the outer surface preferably the outer emulsion surface, of a differentially light-sensitive multilayer color film, a gelatin solution containing preformed spherical particles of an alkali-soluble copolymer of methacrylic acid and methyl methacrylate. Since the particles of polymer are soluble in alkali, they are readily removed from the film during subsequent processing operations including the alkaline development and washing steps, leaving the emulsion surface free of the particles. The mentioned copolymer is particularly efficacious for use in the gelatin layer since its index of refraction does not differ greatly from that of gelatin. Also, the copolymer which preferably is a 1:1 copolymer of methacrylic acid and methyl methacrylate is more readily soluble than other alkali-soluble polymeric materials which have been investigated which characteristic facilitates the removal of the particles from the overcoating layer during processing. While the copolymers of methacrylic acid and methacrylate have been found to give the best results, other alkali-soluble polymers which can be made into particles such as carboxylated hydroxyethylcellulose, carboxymethylcellulose, algin, etc., can be used in the manner described in the examples hereinafter.

One object of the invention is therefore to provide photographic films having adjacent to one surface the mentioned gelatin layer containing minute particles of polymer particularly for the prevention of Newton's rings in printing. Another object is to provide a process for printing multilayer color films provided with the Newton's ring protective layer and the subsequent removal of the protective layer during processing. Other objects will appear from the following description of the invention.

The objects of the invention are accomplished by providing the photographic elements containing the layer of polymer particles and the processes using the same given hereinafter.

The accompanying drawing shows in greatly enlarged cross-sectional view a representative multilayer color print film having adhered to the outer emulsion surface a layer of gelatin containing the alkali-soluble polymer, particularly the methacrylic acid methyl methacrylate copolymer. As shown in the drawing, the support 10 such as a cellulose ester support is provided with superposed silver halide emulsion layers 11, 12 and 13 sensitive to different regions of the spectrum such as the blue, green and red regions. On the outermost emulsion surface is disposed the Newton's ring protective layer 14 of the invention containing gelatin and the alkali-soluble polymer particles.

For the purposes of the invention, the arrangement and composition of the emulsion layers of the multilayer color film carrying the polymeric layer are not especially critical. However, in a preferred embodiment, layers 11, 12 and 13 are gelatin emulsion layers primarily sensitive to the blue, red and green regions of the spectrum, respectively. The film may be constructed as described particularly in reference to FIG. 2 of Jelley et al. U.S. Patent 2,697,037, granted December 14, 1954, wherein the emulsion layers contain colorless coupler compounds for the formation of subtractively colored dye images of colors complementary to the sensitivities of the emulsion layers. Furthermore, the emulsion layers of the film may be uniformly colored with a magenta and/or a cyan dye.

A film thus constructed is particularly useful for the production of motion-picture prints in the process described by W. T. Hanson and W. I. Kisner, SMPTE 61, 667–701 (1953), as the Color Print Film, wherein the problem of Newton's rings is present. That is, during the contact printing of a multilayer color negative film onto a color printing film not provided with the polymeric protective layer of this invention, Newton's rings give appreciable trouble. When the color print film carries the described protective coating, this difficulty disappears. Following the printing operation, when the color print film is developed in an alkaline color developing solution, for example, of the composition of formula SD–31 designated in the above publication, the spherical particles of the polymer in the gelatin overcoating layer are converted to the alkali-metal salt form which is soluble in water and thus removable during processing.

In some instances it may be desirable to insure a more rapid and complete removal of the polymeric particles from the overcoating layer of the color film. In this case a lower grade of gelatin may be used in the layer than is customarily used in silver halide emulsion layers, such as gelatin and glues which are soluble in water at the processing temperature. The solubilization of the polymeric particles and the overcoating layer in alkaline solution can further be facilitated by colloidizing the alcoholic solution of the polymer in the presence of an alkali-soluble derivative of gelatin (such as those described in U.S. Patent 2,614,928), followed by acid coagulation of the mixture, rinsing the coagulum, dispersing by heating and raising the pH somewhat. A suitable dispersion thus prepared may contain about 15.5 percent of the copolymer and about 7.75 percent of the gelatin derivative, which dispersion may then be added to a suitable quantity of aqueous glue solution so as to be able to coat a color print film with a mixture of about 50 milligrams of polymer, about 66 milligrams of glue and about 25 milligrams of the gelatin derivative per square foot of coating surface. Accordingly, it will be found that during the processing of the color print film, both the alkali-soluble spherical polymeric particles and the gelatin of the layer dissolve leaving the surface of the print substantially free of the overcoating layer. One result of this procedure is to improve the light transmission of the color print.

The preparation of the particles of polymer and of a gelatin composition suitable for use in coating a color print film will now be described.

Example 1

300 grams of a 1:1 methacrylic acid-methyl methacrylate copolymer were dissolved in 2400 cc. of n-butyl alcohol. This solution was then added with vigorous stirring to 6000 cc. of 5 percent aqueous gelatin solution. The mixture was then passed through a colloid mill to disperse the polymer, followed by chilling, noodling and washing for 2 hours. The final composition weighing 8636 grams contained 3.48 percent of the polymer and 3.48 percent of gelatin.

7200 grams of this composition containing 250 grams each of the polymer and of gelatin were then melted and mixed with 2040 grams of 10 percent gelatin solution and 890 cc. of 75 percent saponin solution. As thus prepared, the polymer particles were spherical in shape and averaged 1 micron in diameter and ranged in size from somewhat less than 1 micron to about 4 microns in size.

The gelatin solution containing a suspension of the polymer particles thus prepared were then coated upon the emulsion surface of a suitable color film so as to cover about 7150 square feet of surface thus depositing about 35 milligrams of the polymer and 64 milligrams of gelatin per square foot of surface.

The amount of gelatin and polymer particles in the layer depend in part upon the size of the particles. A sufficient amount of the particles must be present at the surface of the coating to prevent the Newton's rings forming but not so many particles that their removal during processing is unduly slow. Conversely, the gelatin should be kept to a minimum. For example, particles averaging 1 micron in diameter prepared as above described may be used in a gelatin layer within the range of about 25 to 50 milligrams per square foot when about 25 to 40 milligrams of gelatin per square foot are present in the layer. The preferred concentration is about 35 milligrams of polymer per square foot with the gelatin concentration as small as possible; that is, using the minimum amount of gelatin required to peptize the polymeric particles. The preferred ratio of gelatin to polymer is 0.75. When the particle size averages about 3 microns, satisfactory coatings have contained as little as 15 milligrams of polymer to 90 milligrams of gelatin per square foot as well as coatings containing 25 milligrams of polymer to 45 milligrams of gelatin per square foot. Very useful results are thus obtained with 25 to 75 mgs. of gelatin and 30 to 70 mgs. of polymer per square foot.

In a variation of the invention, the gelatin layer containing the particles of polymer may be applied to the other surface of the color film, that is, to the support side. This variation of the invention is useful in those cases when it may be desirable to print a film with the emulsion surface in contact with the support side of the color transparency. Furthermore, when the gelatin layer containing the polymer particles is applied to the support side of a sensitive color film, a marked reduction in static is noted.

In a similar manner, Newton's rings may be suppressed during the printing of multilayer color films by spraying the emulsion surface of one of the films with an aqueous suspension of starch particles such as the composition on the market under the name of Non Offset Mix. No. 109 manufactured by the American Type Founders Company, Elizabeth, New Jersey. The spray coating is most conveniently applied to the emulsion surface of the color transparency being printed and can be removed therefrom by subsequent washing when renovation of the film is desired.

In a further variation of the invention the particles of copolymer may be present in a layer adjacent to the other surface of the film or a glass plate support, that is, between the emulsion or emulsions and the support. In this case, advantage can be taken of the ability of the copolymer particles to strongly mordant basic dyes and thus provide an antihalation layer from which the alkali-soluble dyed particles are removable during processing. However, in a preferred embodiment the basic dye is homogeneously mordanted to the particles as opposed to particles of the polymer containing the dye only at the surface.

What we claim is:

1. A multilayer photographic color film which comprises a support having superposed thereon silver halide emulsion layers sensitized to different regions of the spectrum and adhered to the outermost surface of one of said support and outermost emulsion layer a light-insensitive gelatin layer free of color couplers containing spherical particles of from about 1 to 4 microns in size of an approximately 1 to 1 copolymer of methacrylic acid and methyl methacrylate soluble in alkaline photographic processing solutions.

2. A multilayer photographic color film which comprises a support having superposed thereon silver halide emulsion layers sensitized to different regions of the spectrum and adhered to the outermost emulsion surface of said film a light-insensitive gelatin layer free of color couplers containing spherical particles of from about 1 to 4 microns in size of an approximately 1 to 1 copolymer of methacrylic acid and methyl methacrylate soluble in alkaline photographic processing solutions.

3. A multilayer photographic color film which comprises a support having superposed thereon silver halide emulsion layers sensitized to different regions of the spectrum and adhered to the outermost emulsion surface of said film, a light-insensitive gelatin layer free of color couplers containing spherical particles of from about 1 to 4 microns in size of an approximately 1 to 1 copolymer of methacrylic acid and methyl methacrylate soluble in alkaline photographic processing solutions, the gelatin layer containing about 25–75 mgs. of gelatin and about 30–70 mgs. of said copolymer per square foot of surface.

4. The process of printing through a colored film transparency in close contact with a multilayer color print film so as to avoid the formation of Newton's rings, which comprises applying to the outermost emulsion surface of said color print film a light-insensitive gelatin layer free of color couplers containing spherical particles of from about 1 to 4 microns in size of an approximately 1 to 1 copolymer of methacrylic acid and methyl methacrylate soluble in alkaline photographic processing solutions, the gelatin layer containing about 25–75 mgs. of gelatin and about 30–70 mgs. of said copolymer per square foot of surface, printing the resulting color print film with said gelatin layer in contact with said transparency and removing said particles from the gelatin layer by subsequent alkaline development of the color print film.

References Cited in the file of this patent

UNITED STATES PATENTS

| | | |
|---|---|---|
| 2,363,689 | Rackett | Nov. 28, 1944 |
| 2,391,181 | Minsk et al. | Dec. 18, 1945 |
| 2,400,365 | Murray | May 14, 1946 |
| 2,400,366 | Murray | May 14, 1946 |
| 2,422,008 | Glassey | June 10, 1947 |
| 2,518,695 | Jelley | Aug. 15, 1950 |
| 2,698,794 | Godowsky | Jan. 4, 1955 |
| 2,698,795 | Cressman et al. | Jan. 4, 1955 |

FOREIGN PATENTS

| | | |
|---|---|---|
| 575,512 | Great Britain | Feb. 21, 1946 |